Figure 1:
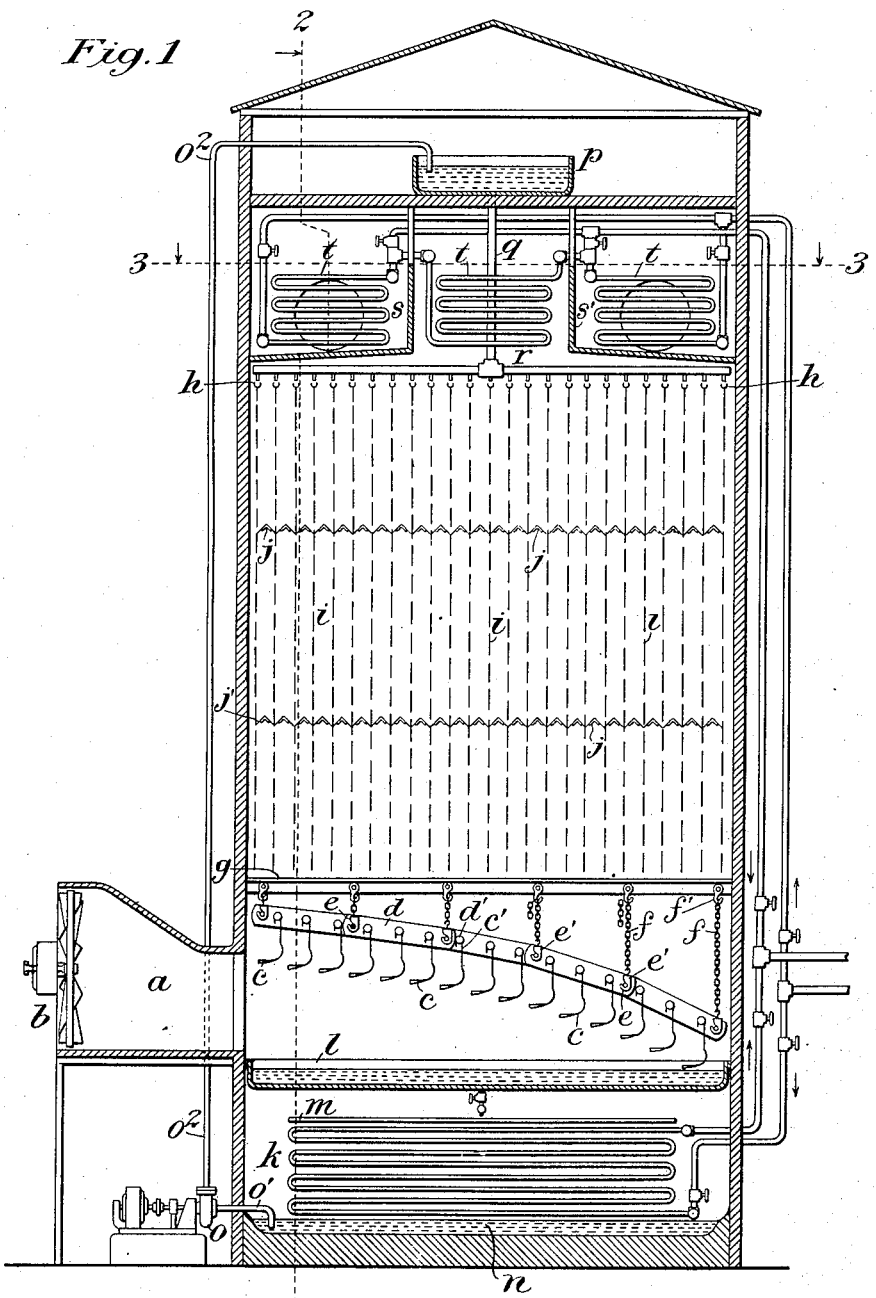

No. 877,520. PATENTED JAN. 28, 1908.
F. SCHMALTZ.
FLUID COOLING APPARATUS.
APPLICATION FILED NOV. 18, 1905.

6 SHEETS—SHEET 1.

Witnesses:
Henry Barnes
Bernard Cowen

Inventor:
Paul Schmaltz
by Henry D. Williams
Atty.

No. 877,520. PATENTED JAN. 28, 1908.
P. SCHMALTZ.
FLUID COOLING APPARATUS.
APPLICATION FILED NOV. 18, 1905.

6 SHEETS—SHEET 4.

Witnesses:
Henry Barnes
Bernard Cowen

Inventor:
Paul Schmaltz
by Henry D. Williams
Atty.

No. 877,520. PATENTED JAN. 28, 1908.
P. SCHMALTZ.
FLUID COOLING APPARATUS.
APPLICATION FILED NOV. 18, 1905.

6 SHEETS—SHEET 5.

Witnesses:
Henry Barnes
Bernard Lowen

Inventor:
Paul Schmaltz
by Henry D. Williams
Atty.

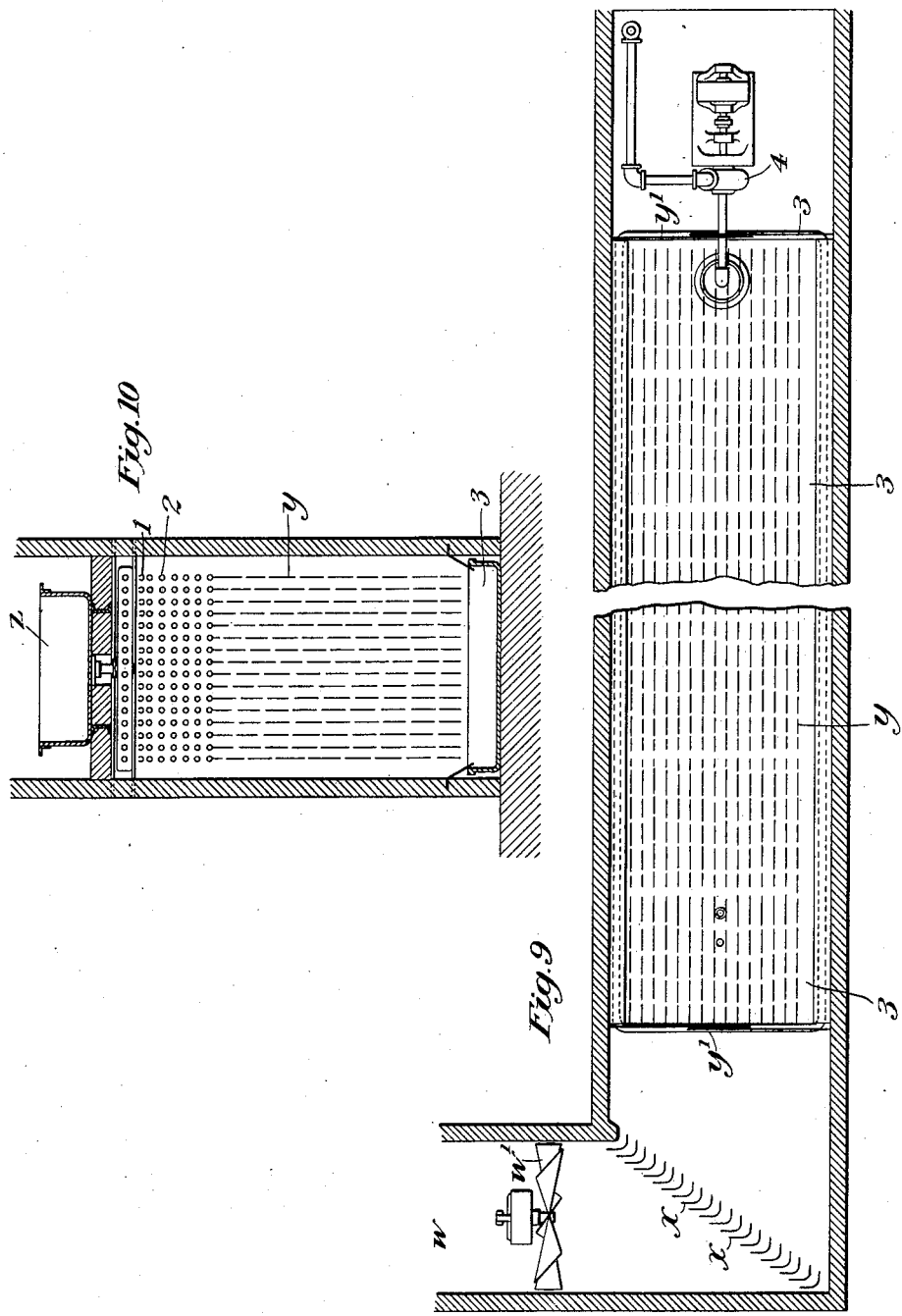

UNITED STATES PATENT OFFICE.

PAUL SCHMALTZ, OF NEW YORK, N. Y., ASSIGNOR TO THE DE LA VERGNE MACHINE COMPANY, OF NEW YORK, N. Y., A CORPORATION OF NEW YORK.

FLUID-COOLING APPARATUS.

No. 877,520.    Specification of Letters Patent.    Patented Jan. 28, 1908.

Application filed November 18, 1905. Serial No. 287,949.

*To all whom it may concern:*

Be it known that I, PAUL SCHMALTZ, a subject of the Emperor of Germany, residing at borough of the Bronx, city of New York, in the county of New York and State of New York, have invented certain new and useful Improvements in Fluid-Cooling Apparatus, of which the following is a specification, reference being had therein to the accompanying drawing, forming a part thereof.

My invention relates generally to fluid cooling apparatus and relates more particularly, in the preferred embodiment thereof hereinafter described, to apparatus for cooling air and thereby drying the same or reducing the amount of moisture therein to a predetermined constant percentage.

My invention has for its objects simplicity of construction and effectiveness of operation and economy both in plant and maintenance.

Other objects of my invention will appear from the following description of apparatus embodying my invention.

My invention includes means for changing the direction of movement of a body of air without the formation of eddies or counter-currents therein and with a desired distribution or with a substantially uniform distribution of the air when deflected to the desired direction of movement, and also more specifically with a reduction of the speed of the movement of the air in its final direction of movement, permitting air to be forced or drawn into the apparatus through a comparatively small inlet and then deflected upward or in the desired direction and distributed throughout a cooling chamber of large cross-sectional area so as to flow therein at reduced speed in substantial parallelism to the walls of the chamber or to cooling surfaces therein.

My invention also includes the provision of a cooling chamber or tower, with means for causing a liquid to flow downward therein and for causing air to flow in another direction therein so that an interchange of heat will take place between the liquid and the air, combined with various improvements in the construction and combination of parts.

My invention also includes various improvements in the construction and combination of parts generally applicable to means for cooling fluids and specifically combined with apparatus such as above referred to.

I will now describe the constructions shown in the accompanying drawings and embodying my invention and will thereafter point out my invention in claims.

Figure 2:
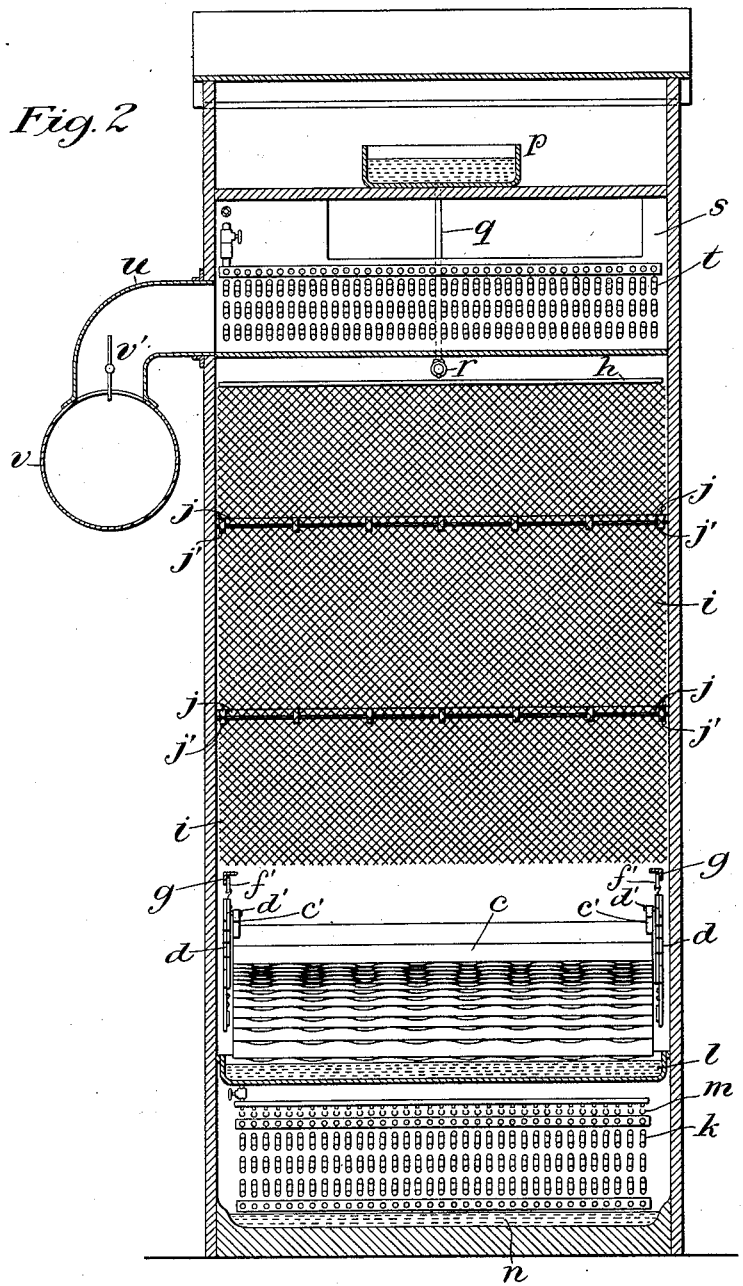
Figure 3:
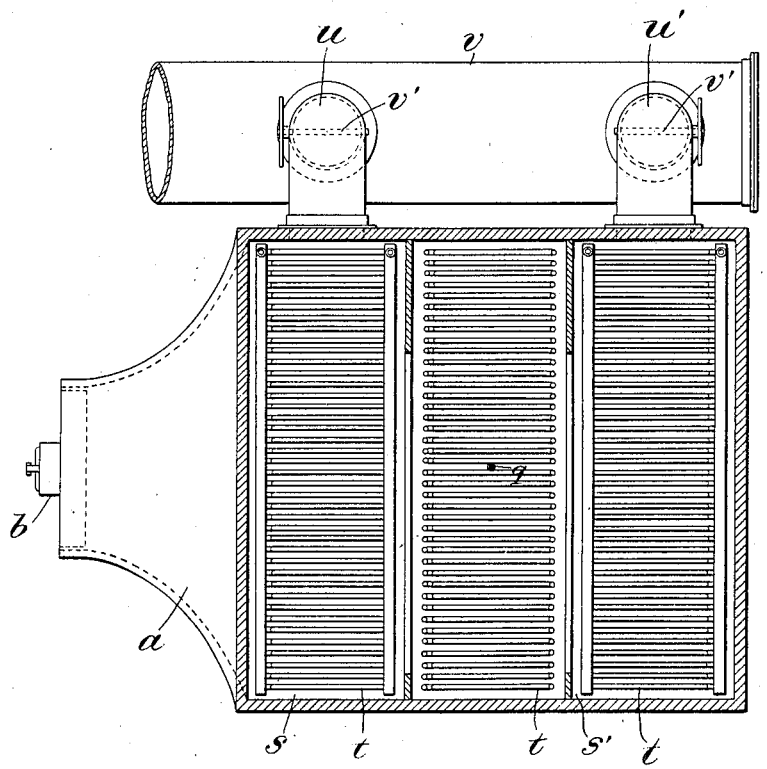
Figure 4:
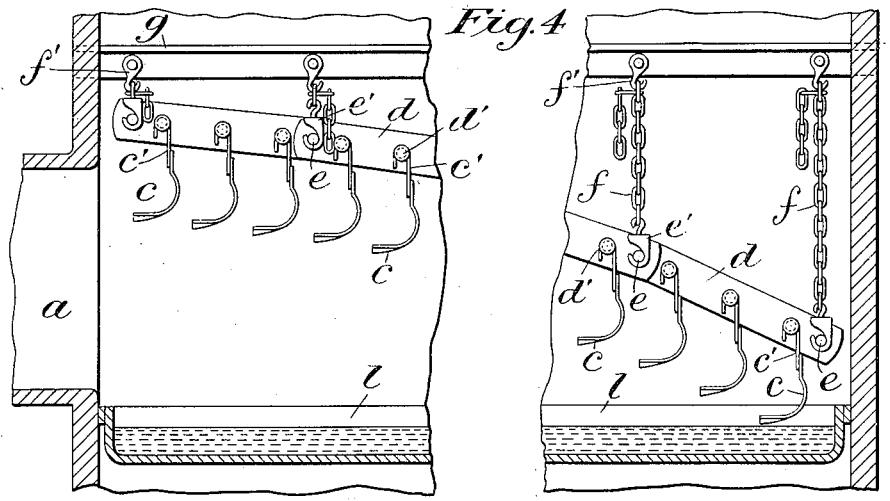
Figure 5:
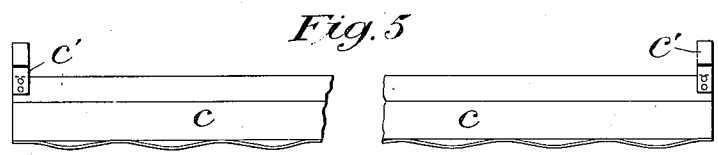
Figures 6, 7:
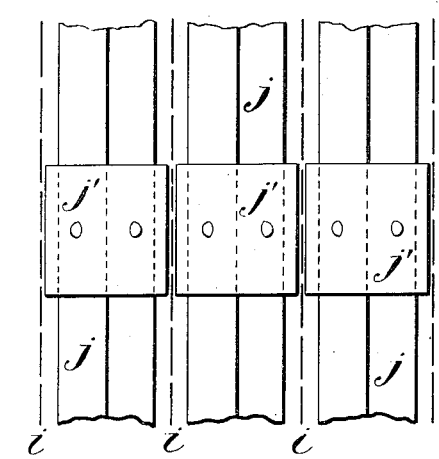
Figure 8:
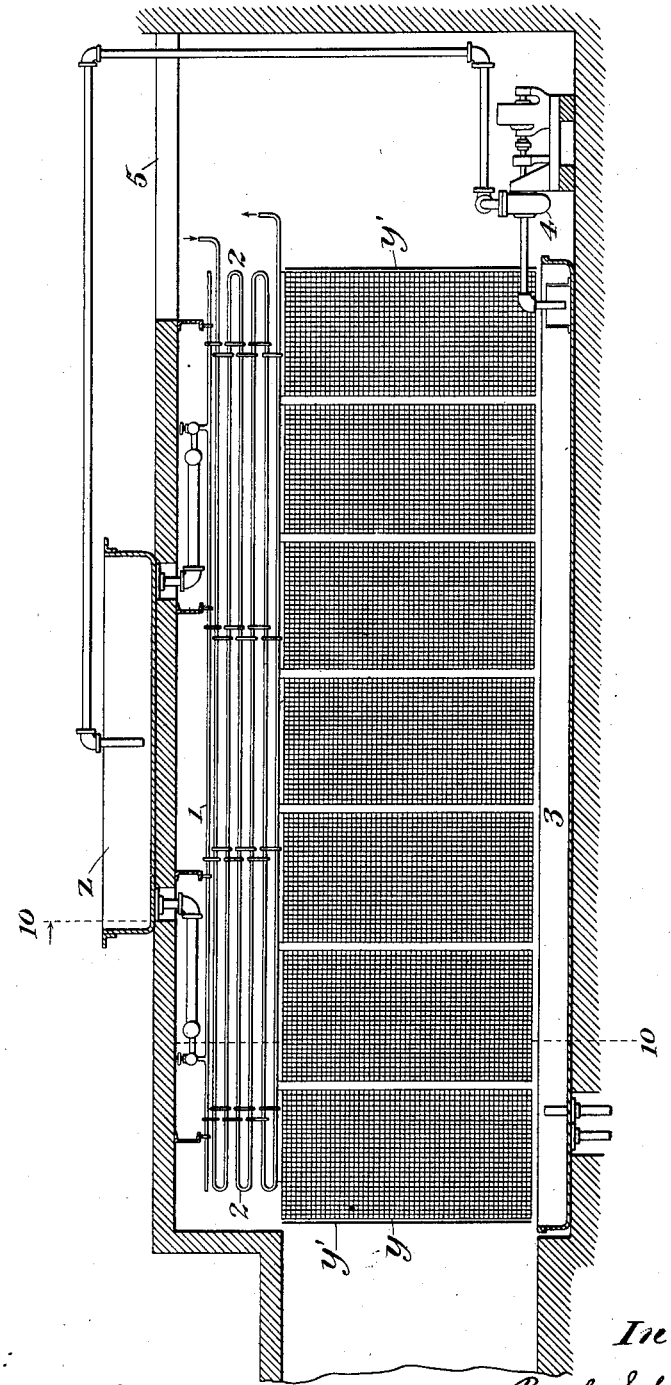

Figure 1 is a vertical longitudinal section of an air drying tower embodying my invention. Fig. 2 is a vertical transverse section of the same, taken on a plane indicated by the line 2—2, Fig. 1. Fig. 3 is a horizontal section of the same taken on a plane indicated by the line 3—3, Fig. 1. Fig. 4 is an enlarged vertical longitudinal section, medially broken away, of the lower part of the tower and the air-deflector therein. Fig. 5 is a detail front elevation of one of the deflector-plates. Fig. 6 is an enlarged vertical longitudinal section of a portion of the water-conveying screens and the baffle-plates thereon. Fig. 7 is a horizontal section taken on a plane indicated by the line 7—7, Fig. 6. Fig. 8 is a vertical longitudinal section of an air cooling chamber embodying my invention. Fig. 9 is a horizontal section and Fig. 10 a vertical section of the same.

The object of the construction shown in Figs. 1 to 7, inclusive, is to extract moisture from air so as to reduce the amount of moisture therein to a predetermined constant percentage for use in blast furnaces or converters. Incidentally thereto the air is cooled to a low temperature approaching the freezing point of water, and at this low temperature may be economically fed by blowers to any desired place.

The moisture extracting or drying operation is performed in a closed structure preferably of greater vertical than horizontal dimensions and in which the air is caused to flow upward and which may therefore be termed a tower, although only of moderate height. This air drying tower is provided with an air inlet conduit *a* at its lower end, at the entrance of which is located a blower *b*, which drives the air through the conduit and into the lower part of the tower. The inlet conduit flares outward horizontally as it approaches the tower so that the air spreads out laterally to the full width of the tower.

At the lower part of the air drying tower, in alinement with the air inlet opening, a deflector for the inflowing air is provided, this deflector comprising a plurality of deflector-plates *c* having substantially horizontal lower portions and presenting their edges to the inflowing air from the blower at different heights so as to divide the incoming air into layers which are received between adjacent deflector-plates. The lower horizontal portions of the deflector-plates are also provided with inclined or water-shedding surfaces leading to a plurality of water-discharging depressions at different portions of the lengths of the plates so as to discharge the water which falls upon them only at predetermined points throughout their lengths, thus preventing the formation of a veil of downflowing water such as would prevent the flow of air to points remote from the inlet. Each deflector-plate $c$ also has an easy curvature starting from the horizontal direction and terminating in nearly vertical direction, the curvature passing however slightly beyond the vertical to more effectually deflect upward the forcefully horizontally driven air, and each plate terminating in a vertical upper portion; and these deflector-plates separately effect the upward deflection of the layers of air flowing between them without the formation of eddies or counter-currents and with substantial uniformity throughout the length and width of the tower. They also effect a reduction of the speed of the air and an equal distribution of the air flowing at reduced speed, it being noted that the plates are at their front or air-receiving portions closer together vertically or in a direction transverse to the direction of movement of the inflowing air, than at their upper or terminal portions horizontally or in a direction transverse to the vertically upward final direction of movement of the air as it passes from the deflector up into the cooling tower. The separate layers of air are thus separately spread out into a greater width proportionate to the increased cross-section of the tower as compared with the cross-section of the inlet to the tower, and delivered equally distributed at the desired slow rate of speed for movement up the tower and in contact with the cooling surfaces thereof.

To compensate for the greater travel of the air which passes to the parts of the tower at greatest distances from the inlet opening, the deflector-plates are differentially spaced vertically at their air-receiving portions and are separated or spaced at increasing vertical distances as their distance from the air inlet increases, while the horizontal distances between the plates at their upper or terminal portions are substantially uniform throughout the length of the tower. Thus it may be said that the plates most remote from the inlet receive a thicker layer of air than those in closest proximity to the inlet. This differential vertical spacing of the deflector-plates may however be varied to suit the requirements of each structure embodying the invention and provision for such variation or adjustment is made in the manner of supporting the plates. Each plate is supported at each end by hooks $c'$ shown as riveted thereto and passing over supporting studs $d'$ projecting inward from a linked side-frame consisting of a pluraity of side-bars $d$, these side-bars being pivotally connected together by pins $e$ which also receive supporting hooks $e'$. The supporting hooks are secured at the lower ends of supporting chains $f$ and the chains are supported at their upper ends by hooks $f'$ depending from side beams $g$, these side beams forming part of the rigid structure of the tower. The supporting pins $e$ provide a plurality of supporting points in a flexible frame, and the inclinations of the several parts of the flexible frame may be varied to suit the peculiar conditions of each installation by adjustment of the lengths or points of engagement of the respective chains and to effect the arrangement above described the separate links of the frame are arranged as shown at increasing inclinations as the distance from the inlet increases.

Owing to the pivotal adjustment permitted by the hooks $c'$ and the studs $d'$ the deflector-plates may be maintained in their proper angular positions, with their lower portions horizontal and their upper portions vertical, regardless of the changes in the inclination of the side bars $d$ incidental to their adjustment to vary the vertical relations of the deflector-plates to each other, and thus the spacing of the deflector-plates may be adjusted without displacing them angularly from their positions of greatest efficiency.

Within the air drying tower above the deflector the heat abstracting or cooling means are provided and consist primarily of suspended open-work screens $i$, preferably of wire netting, which are constantly supplied with a cooling fluid such as artificially cooled water which flows downward over their surfaces. These screens $i$ are suspended from separate water supply pipes or troughs $h$ and extend from such troughs downward through the tower, terminating just above the deflector. At intervals in the height of these screens baffle-plates $j$ are provided, each consisting of a light angle-bar arranged with its sides sloping downward and outward and terminating in proximity to the screens but so as to leave a small opening between each angle-bar edge and the screen adjacent thereto. These angle-bars are provided with angle-straps $j'$, which are secured to the angle-bars and to the screens and are arranged at suitable intervals in the width of the tower. The angle-straps serve to maintain the screens properly spaced in relation to each other and to the angle-bars. These angle-bar baffle-plates change the direction of the flow of the air which is between the screens and lead it into contact with the cooling fluid on the screens and also temporarily accelerate its movement, assuring a redistribution of the upwardly flowing air as it is compelled to pass between the baffle-plates in close contact with the cooling fluid on the screens. They also catch any spray or spatterings and direct them to the screens.

The cooling water is cooled to a temperature approaching as nearly as practicable its freezing point by means of a refrigerating coil $k$, which may be directly cooled by the expansion of ammonia therein, and which is shown as located at the base of the tower. A receiving tank $l$ just below the air-deflector catches all the liquid which flows downward through the tower and from this tank the water flows into distributing pipes or troughs $m$ from which it flows downward over the refrigerating pipes $k$ and into a receptacle $n$ at the bottom of the tower, and from this receptacle $n$ it is pumped by suitable pumping means, shown as the rotary pump $o$, through pipes $o'$ and $o^2$ to a reservoir $p$ at the top of the tower. From this reservoir $p$ it passes downward through the pipe $q$ into a longitudinal pipe $r$ provided with a plurality of nipples whereby the water is discharged into the separate troughs $h$, from which it flows downward over the heat-abstracting screens $i$.

At the top of the tower additional cooling chambers are provided comprising a chamber arranged medially of the length of the tower between the partitions $s$ and $s'$ and two end chambers formed respectively between the partition $s$ and a wall of the tower and the partition $s'$ and a wall of the tower, the partitions $s$ and $s'$ having large openings at their upper portions for ingress of air. Within these chambers are provided refrigerating coils $t$ which are shown as connected in the same system with the refrigerating coils at the base of the tower. Separate outlets $u$ and $u'$ are provided from the end chambers into a dry-air conduit $v$ and each outlet is provided with a valve or damper $v'$ whereby the flow of air through it may be arrested so that the air from the tower may be led either to one or the other or both of the end chambers as may be desired and either end chamber may be temporarily put out of use to melt any frost which may have formed upon its pipes.

It will be seen that the refrigerating coils $t$ are so connected that the refrigerant may be caused to flow first through the coils in either end chamber and then through the coils in the middle chamber or only through the coils in either end chamber or in any other manner desired, the middle chamber preferably, however, receiving the refrigerant which has first passed through an end chamber so that its temperature will not be as low as that of the coils in the end chambers and the formation of frost upon it a negligible factor.

In the operation of the device, the drying of the air will be principally effected by its contact with the cooling fluid flowing down the vertical screens in the tower, and the moisture condensed and precipitated from the air will be commingled with the cooling fluid and will flow to the receiving tank. The air will flow into the chambers at the top of the tower reduced to a temperature approaching that of the freezing point of water and carrying with it only the very small percentage of moisture which will exist in air thus cooled. This percentage of moisture will uniformly be the maximum small percentage capable of existing in air at the temperature to which the air has been cooled and thus the air will be delivered from the tower with a uniform small percentage of moisture. The refrigerating coils in the upper chambers may or may not be used, but should it be desired to further lower the temperature of the air they will effectively perform this operation.

The object of the construction shown in Figs. 8, 9 and 10 is to cool air for use in theaters or for other purposes. Incidentally to the cooling operation there is a precipitation of moisture and consequent drying of the air. The structure here shown is an elongated horizontal chamber, which may be located in the cellar of the building to be cooled. An inlet conduit $w$ has a blower $w'$ located therein and opens into the cooling chamber at the side thereof, and a deflector for the inflowing air is provided comprising a plurality of deflector-plates $x$ vertically arranged with portions in substantial parallelism to the inflowing air and presenting their edges to the inflowing air and having an easy curvature terminating in portions extending in the direction of the length of the cooling chamber, this deflector effecting the uniform distribution of the inflowing air and its entrance into the cooling chamber with a direction of movement parallel to the length of the cooling chamber. The cooling screens $y$ are vertically and longitudinally arranged. Additional cross-screens $y'$ are provided at the ends of the longitudinal cooling screens to screen the air and act as spray-catchers. The refrigerating coils 2 for the cooling fluid are here shown as located directly above the screens and the cooling water flows from a reservoir $z$ into a distributing pipe or trough 1, from which it flows upon the refrigerating coils 2; and from the refrigerating coils 2 it falls upon the screens and flows down over the screens, performing its heat-abstracting function, and finally drops within the receiving tank 3, from which it is lifted by the pump 4 to the reservoir $z$. The air after it passes the screens flows upward through the outlet opening 5 to the room or building to be cooled.

It is obvious that various modifications may be made in the constructions shown and above particularly described within the principle and scope of my invention.

What I claim and desire to secure by Letters Patent is:—

1. The combination of a single air chamber containing parallel cooling screens, an air inlet therefor, means for causing air to flow into the chamber through such inlet at an angle to the desired direction of movement of the air through the chamber, a deflector arranged obliquely relatively to the direction of movement of the inflowing air and the desired direction of movement of the air through the chamber comprising a plurality of deflector-plates arranged to divide the inflowing air into layers entering between them and to deflect the air to the direction of the desired movement of the air in the chamber, and means for adjusting the position of the deflector.

2. The combination of an air chamber, an air inlet therefor, means for causing air to flow into the chamber through such inlet at an angle to the desired direction of movement of the air through the chamber, a deflector comprising a plurality of deflector-plates carried by a flexible frame having a plurality of supporting points, and means for adjustably supporting such frame.

3. The combination of a single air chamber containing parallel cooling screens, an air inlet therefor, means for causing air to flow into the chamber through such inlet at an angle to the desired direction of movement of the air through the chamber, a deflector arranged obliquely relatively to the direction of movement of the inflowing air and the desired direction of movement of the air through the chamber and comprising a plurality of deflector-plates arranged to divide the inflowing air into layers entering between them and curved to deflect the air to the direction of the desired movement of the air in the chamber, and means for adjusting the position of the deflector.

4. The combination of an air chamber, an air inlet therefor, means for causing air to flow into the chamber through such inlet at an angle to the desired direction of movement of the air through the chamber, a deflector comprising a plurality of curved deflector-plates carried by a flexible frame having a plurality of supporting points, and means for adjustably supporting such frame.

5. The combination of an air chamber containing parallel cooling screens, an air inlet therefor, means for causing air to flow into the chamber through such inlet at an angle to the desired direction of movement of the air through the chamber, and a deflector interposed in the path of the inflowing air and comprising a plurality of deflector-plates arranged to divide the inflowing air into layers entering between them and curved to deflect the air to the direction of the desired movement of the air in the chamber, the deflector-plates having air-receiving portions extending substantially in the general direction of the movement of the inflowing air and the deflector-plates terminating in portions extending substantially in the general direction of the desired movement of the air in the chamber.

6. The combination of a single cooling chamber having a plurality of cooling surfaces therein spaced apart for the flow of air between them, an air inlet therefor, means for causing air to flow into the chamber through such inlet at an angle to the cooling surfaces in the chamber, and a deflector interposed in the path of the inflowing air between the cooling surfaces and the inlet and comprising a plurality of deflector-plates arranged to divide the inflowing air into layers entering between them and curved to deflect the air to the general direction of the cooling surfaces in the cooling chamber.

7. The combination of a cooling chamber having a plurality of cooling surfaces therein spaced apart for the flow of air between them, an air inlet therefor, means for causing air to flow into the chamber through such inlet at an angle to the cooling surfaces in the chamber, and a plurality of curved deflector-plates interposed in the path of the inflowing air and arranged to divide the inflowing air into layers entering between them, the deflector-plates having air-receiving portions extending substantially in the direction of the movement of the inflowing air and the deflector-plates terminating in portions extending substantially in the direction of the cooling surfaces in the cooling chamber.

8. The combination of a cooling chamber having a plurality of cooling surfaces therein spaced apart for the flow of air between them, an air inlet therefor, means for causing air to flow into the chamber through such inlet at an angle to the cooling surfaces in the chamber, and a deflector interposed in the path of the inflowing air and comprising a plurality of deflector-plates arranged to divide the inflowing air into layers entering between them and curved to deflect the air to the general direction of the cooling surfaces in the cooling chamber, the deflector-plates having air-receiving portions extending substantially in the direction of the movement of the inflowing air and the deflector-plates terminating in portions extending substantially in the direction of the cooling surfaces in the cooling chamber.

9. The combination of a cooling chamber having a plurality of cooling surfaces therein spaced apart for the flow of air between them, means for causing air to flow between and in contact with the cooling surfaces, and baffle-plates interposed in the passage between the cooling surfaces whereby the air passages are temporarily restricted and the air is redistributed.

10. The combination of a cooling tower having a plurality of surfaces therein spaced apart for the flow of air between them, means for causing a liquid to flow downward over such surfaces and for causing air to flow upward between and in contact with the liquid-supplied surfaces, and spray-catching baffle-plates interposed in the air passages between the liquid-supplied surfaces.

11. The combination of a cooling chamber having a plurality of open-work screens therein arranged in substantial parallelism to the direction of movement of the air in such chamber and spaced apart for the flow of air between them, and baffle-plates interposed in the passages between the cooling surfaces whereby the air passages are temporarily restricted and the air is redistributed.

12. The combination of a cooling tower having a plurality of open-work screens therein arranged in substantial parallelism to the direction of movement of the air in the tower and spaced apart for the flow of air between them, means for causing a liquid to flow downward over such screens and for causing air to flow upward between and in contact with the liquid-supplied surfaces thereof, and spray-catching baffle-plates interposed in the passages between the screens.

13. A cooling tower having a wet cooling chamber therein and having a dry cooling chamber above the wet cooling chamber and having additional dry cooling chambers combined with means for causing air to flow upward through the wet cooling chamber and thereafter through the first mentioned dry cooling chamber and thereafter through less than the whole number of additional dry cooling chambers.

14. A cooling tower having a wet cooling chamber therein and having a dry cooling chamber above the wet cooling chamber and having additional dry cooling chambers at opposite sides of the first mentioned dry cooling chamber, combined with means for causing air to flow upward through the wet cooling chamber and thereafter through the first mentioned dry cooling chamber and thereafter through one of the additional dry cooling chambers.

15. A cooling tower combined with means for causing a liquid to flow downward therein, an air inlet therefor, means for causing air to flow into the tower through such inlet at an angle to the desired direction of the movement of the air through the tower, and deflector-plates interposed in the path of the inflowing air and arranged to divide the inflowing air into layers entering between them and shaped so as to deflect the air to the desired direction of movement of the air in the tower, the deflector-plates being provided with water-shedding surfaces leading to a plurality of water-discharging depressions located at different portions of the lengths of the plates.

16. A cooling tower combined with means for causing a liquid to flow downward therein, an air inlet therefor, means for causing air to flow into the tower through such inlet at an angle to the desired direction of the movement of the air through the tower, and a deflector arranged obliquely relatively to the direction of movement of the inflowing air and the desired direction of movement of the air through the tower and comprising a plurality of deflector-plates arranged to divide the inflowing air into layers entering between them and shaped to deflect the air to the desired direction of movement of the air in the tower, the deflector-plates being provided with water-shedding surfaces leading to a plurality of water-discharging depressions located at different portions of the lengths of the plates.

17. The combination of an air chamber containing parallel cooling screens, an air inlet therefor, means for causing air to flow into the chamber through such inlet at an angle to the desired direction of movement of the air through the chamber, a deflector arranged obliquely relatively to the direction of movement of the inflowing air and the desired direction of movement of the air through the chamber and comprising a plurality of deflector-plates arranged to divide the inflowing air into layers entering between them and curved to deflect the air to the direction of the desired movement of the air in the chamber, the deflector-plates having air-receiving portions extending substantially in the direction of the movement of the air entering between them and the deflector-plates terminating in portions extending substantially in the desired final direction of movement of the air, and means for adjusting the position of the deflector.

18. The combination of an air chamber, an air inlet therefor, means for causing air to flow into the chamber through such inlet at an angle to the desired direction of movement of the air through the chamber, a deflector comprising a plurality of deflector-plates arranged to divide the inflowing air into layers entering between them and curved to deflect the air to the direction of the desired movement of the air in the chamber, the deflector-plates having air-receiving portions extending substantially in the general direction of the movement of the inflowing air and terminating in portions extending substantially in the general direction of the desired movement of the air in the chamber, the deflector-plates being carried by a flexible frame having a plurality of supporting points, and means for adjustably supporting such frame.

19. A cooling tower combined with means for causing a liquid to flow downward therein, an air inlet therefor, means for causing air to flow into the tower through such inlet at an angle to the desired direction of the movement of the air through the tower, and deflector-plates interposed in the path of the inflowing air and arranged to divide the inflowing air into layers entering between them and curved to deflect the air to the direction of the desired movement of the air in the tower, the deflector-plates having air-receiving portions extending substantially in the general direction of the movement of the inflowing air and the deflector-plates terminating in portions extending substantially in the general direction of the desired movement of the air in the chamber and the deflector-plates being provided with water-shedding surfaces leading to a plurality of air-discharging depressions located at different portions of the lengths of the plates.

20. A cooling tower combined with means for causing a liquid to flow downward therein, an air inlet therefor, means for causing air to flow into the tower through such inlet at an angle to the desired direction of the movement of the air through the tower, and a deflector arranged obliquely relatively to the direction of movement of the inflowing air and the desired direction of movement of the air through the tower and comprising a plurality of deflector-plates arranged to divide the inflowing air into layers entering between them and curved to deflect the air to the desired direction of movement of the air in the tower, the deflector-plates having air-receiving portions extending substantially in the general direction of the movement of the inflowing air and the deflector-plates terminating in portions extending substantially in the general direction of the desired movement of the air in the tower and the deflector-plates being provided with water-shedding surfaces leading to a plurality of water-discharging depressions located at different portions of the lengths of the plates, substantially as shown and described.

21. Means for changing the direction of a current of air comprising a series of deflector-plates arranged across the path of the air, and means for varying the distances between the deflector-plates without changing their angular relation to the air current.

22. Means for changing the direction of a current of air comprising a series of deflector-plates arranged across the path of the air, supporting members for the plates, means for adjusting the position of the supporting members to vary the distances between the plates, and pivotal connections between the plates and the supporting members, permitting the plates to be maintained in the proper angular position, regardless of the position of the supporting members.

23. Fluid-cooling apparatus having, in combination, an air-cooling chamber provided with cooling surfaces, and baffle plates in the air passages adjacent to the cooling surfaces and closely restricting the air currents at their edges to the cooling surfaces.

24. Means for changing the direction of a current of air comprising a deflector consisting of a series of deflector plates of substantially equal width and similar form arranged with unobstructed spaces between them and with their initial and terminal edges respectively lying substantially in the same planes, the deflector as a whole being arranged obliquely across the path of the air so that the plates are individually inclined to the direction of motion of the entering air and receive and deliver the air in planes inclined to its direction of motion.

In testimony whereof I have affixed my signature in presence of two witnesses.

PAUL SCHMALTZ.

Witnesses:
 HENRY BARNES,
 OTTO PAUL.